US012352665B2

(12) United States Patent
Schlipf et al.

(10) Patent No.: US 12,352,665 B2
(45) Date of Patent: Jul. 8, 2025

(54) SYSTEMS AND METHODS FOR TESTING AGRICULTURAL IMPLEMENTS

(71) Applicant: Precision Planting LLC, Tremont, IL (US)

(72) Inventors: Ben L Schlipf, Tremont, IL (US); Matthew Klopfenstein, Columbus, OH (US)

(73) Assignee: Precision Planting LLC, Tremont, IL (US)

( * ) Notice: Subject to any disclaimer, the term of this patent is extended or adjusted under 35 U.S.C. 154(b) by 331 days.

(21) Appl. No.: 17/767,205

(22) PCT Filed: Jun. 4, 2020

(86) PCT No.: PCT/IB2020/055275
§ 371 (c)(1),
(2) Date: Apr. 7, 2022

(87) PCT Pub. No.: WO2021/069976
PCT Pub. Date: Apr. 15, 2021

(65) Prior Publication Data
US 2022/0364958 A1    Nov. 17, 2022

Related U.S. Application Data

(60) Provisional application No. 62/911,715, filed on Oct. 7, 2019.

(51) Int. Cl.
*G01M 99/00*    (2011.01)
*A01B 76/00*    (2006.01)

(52) U.S. Cl.
CPC ........... *G01M 99/005* (2013.01); *A01B 76/00* (2013.01)

(58) Field of Classification Search
CPC .. A01B 76/00; G01M 99/005; H05K 13/0408
See application file for complete search history.

(56) References Cited

U.S. PATENT DOCUMENTS

| 3,656,061 A | 4/1972 | Mallory |
| 4,884,032 A | 11/1989 | LaPensee |

(Continued)

FOREIGN PATENT DOCUMENTS

| DE | 20 2013 102917 U1 | 7/2013 |
| EP | 3518053 A1 | 7/2019 |

(Continued)

OTHER PUBLICATIONS

Welnavigate, Inc, GS-100 instruction guide, retrieved from the internet https://aeroexpress.com/wp-content/uploads/2015/03/welnavigate-gs100.pdf (Year: 2002).*

(Continued)

*Primary Examiner* — John E Breene
*Assistant Examiner* — Alex T Devito

(57) ABSTRACT

A portable system for testing or demonstrating an agricultural implement includes a case (104) carrying a power supply (206), a plurality of electrical couplers (120) configured to receive wiring harnesses associated with test devices, a simulator module (214) configured to simulate at least one operating parameter of the agricultural implement on which test devices are carried, and a control system. The control system includes a graphical user interface (110) and processing circuitry operably electrically coupled to the graphical user interface (110) and to the wiring harnesses. The processing circuitry is configured to monitor and display information pertaining to operation of the test devices. A method for testing or demonstrating an agricultural implement includes connecting a test device an electrical coupler of the portable system, sending a control signal to the test device, and monitoring performance of the test device with (Continued)

the control system. The control signal is based at least in part on the data input.

19 Claims, 4 Drawing Sheets

(56) References Cited

U.S. PATENT DOCUMENTS

| | | | | |
|---|---|---|---|---|
| 5,922,041 | A * | 7/1999 | Anderson | G01C 25/00 |
| | | | | 701/521 |
| 6,114,989 | A * | 9/2000 | Fontes | G01S 19/23 |
| | | | | 342/357.57 |
| 6,735,523 | B1 * | 5/2004 | Lin | G01S 19/23 |
| | | | | 701/472 |
| 8,571,751 | B1 | 10/2013 | Blair | |
| 2009/0050704 | A1 | 2/2009 | Harrison, Jr. | |
| 2016/0077071 | A1 * | 3/2016 | Chancey | G01N 33/0001 |
| | | | | 73/1.06 |
| 2018/0263180 | A1 | 9/2018 | Schlipf et al. | |
| 2019/0246556 | A1 | 8/2019 | Stoller et al. | |
| 2019/0254226 | A1 | 8/2019 | Hodel et al. | |

FOREIGN PATENT DOCUMENTS

| | | | | |
|---|---|---|---|---|
| JP | H09162813 | * | 6/1997 | |
| JP | H09162813 | A | 6/1997 | |
| KR | 101897992 | * | 9/2018 | |
| WO | 2001031177 | A1 | 5/2001 | |
| WO | WO-0131177 | A1 * | 5/2001 | ............. F01P 7/048 |

OTHER PUBLICATIONS

European Patent Office, International Search Report related to International Patent Application No. PCT/IB2020/055275, mail date Aug. 6, 2020.

UK Intellectual Property Office, Search report for related UK Application No. GB1915198.4, dated Apr. 20, 2020.

Instituto Nacional de la Propiedad Industrial, Search Report for AR Application No. 20200102681, dated Nov. 22, 2023, 8 pages including English translation.

The State Organization Ukrainian National Office for Intellectual Property and Innovations, Search Report for related UA Application No. a202201470, dated Nov. 1, 2024, 12 pages.

* cited by examiner

SYSTEMS AND METHODS FOR TESTING AGRICULTURAL IMPLEMENTS

CROSS-REFERENCE TO RELATED APPLICATION

This application claims the benefit of the filing date of U.S. Provisional Patent Application 62/911,715, "Systems and Methods for Testing Agricultural Implements," filed Oct. 7, 2019, the entire disclosure of which is incorporated herein by reference.

FIELD

Embodiments of the present disclosure relate generally to test systems and methods for validating and calibrating agricultural equipment, such as planters, fertilizer applicators, etc.

BACKGROUND

Crop yields are affected by a variety of factors, such as seed placement, soil quality, weather, irrigation, and nutrient applications. Seeds are typically planted in trenches formed by discs or other mechanisms of a planter row unit.

Adding materials (such as fertilizers) adjacent to seed trenches during planting is a good way to deliver the materials to the soil for growing plants to access the material during a later growing stage. This eliminates a pass over the field to reduce compaction of the soil from separate planting and material application passes. Some of the fertilizer is placed adjacent to the seed trench, and when the plant grows and extends into the zone where the fertilizer was placed, the plant can then use the fertilizer.

There are various implements that deliver fertilizer to soil adjacent to the trench on a planter row unit. These implements generally have coulters or knives to open a space adjacent the trench and include a liquid delivery tube for delivering fertilizer. The amount of liquid is controlled to control the amount of fertilizer. Such implements are described in, for example, U.S. Patent Application Publication 2018/0263180, "Systems and Devices for Controlling and Monitoring Liquid Applications of Agricultural Fields," published Sep. 20, 2018; U.S. Patent Application Publication 2019/0254226, "Systems, Methods, and Apparatus for Agricultural Material Application," published Aug. 22, 2019; and U.S. Patent Application Publication 2019/0246556, "Implements and Application Units Having a Fluid Applicator with Nozzles for Placement of Applications with Respect to Agricultural Plants of Agricultural Fields," published Aug. 15, 2019.

BRIEF SUMMARY

A portable system for testing or demonstrating an agricultural implement includes a case carrying a power supply, a plurality of electrical couplers configured to receive wiring harnesses associated with test devices, a simulator module configured to simulate at least one operating parameter of the agricultural implement on which test devices are carried, and a control system. The control system comprises a graphical user interface and processing circuitry operably electrically coupled to the graphical user interface and to the wiring harnesses. The processing circuitry is configured to monitor and display information pertaining to operation of the test devices.

A method for testing or demonstrating an agricultural implement includes connecting at least one test device to at least one of the electrical couplers of the portable system, sending a control signal to the at least one test device, and monitoring performance of the at least one test device with the control system. The control signal is based at least in part on the data input.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
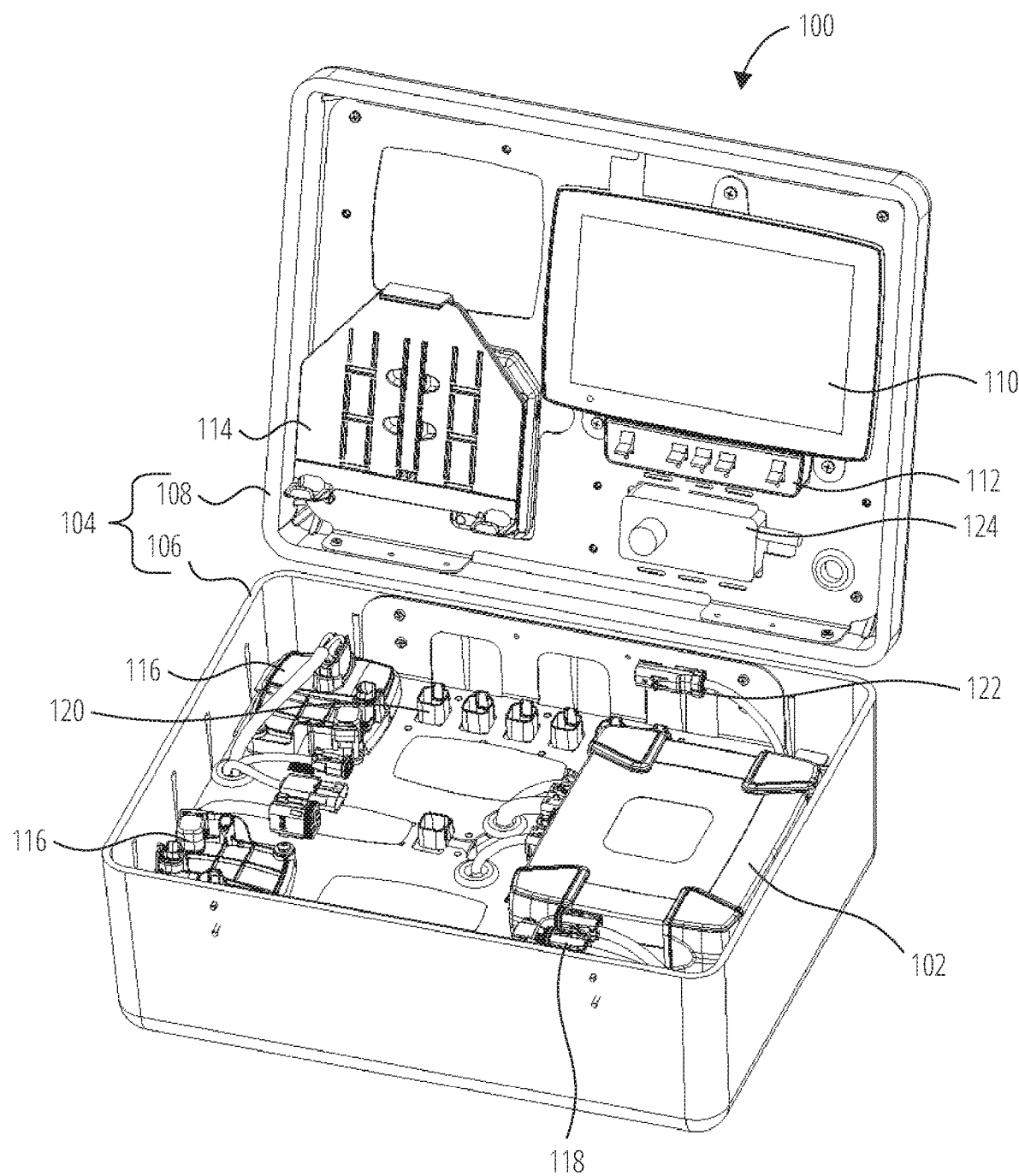
FIG. 1 is a simplified perspective view of a portable system for testing or demonstrating an agricultural implement.

The illustrations presented herein are not actual views of any planter or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

As used herein, the term "testing" includes validating proper operation of a test device, calibrating a test device, and other quality control measures.

As used herein, the term "demonstrating" includes displaying features to actual or potential customers or other observers, training operators, and any other public or private display.

As used herein, the term "test device" means any device being tested or demonstrated.

Figure 2:
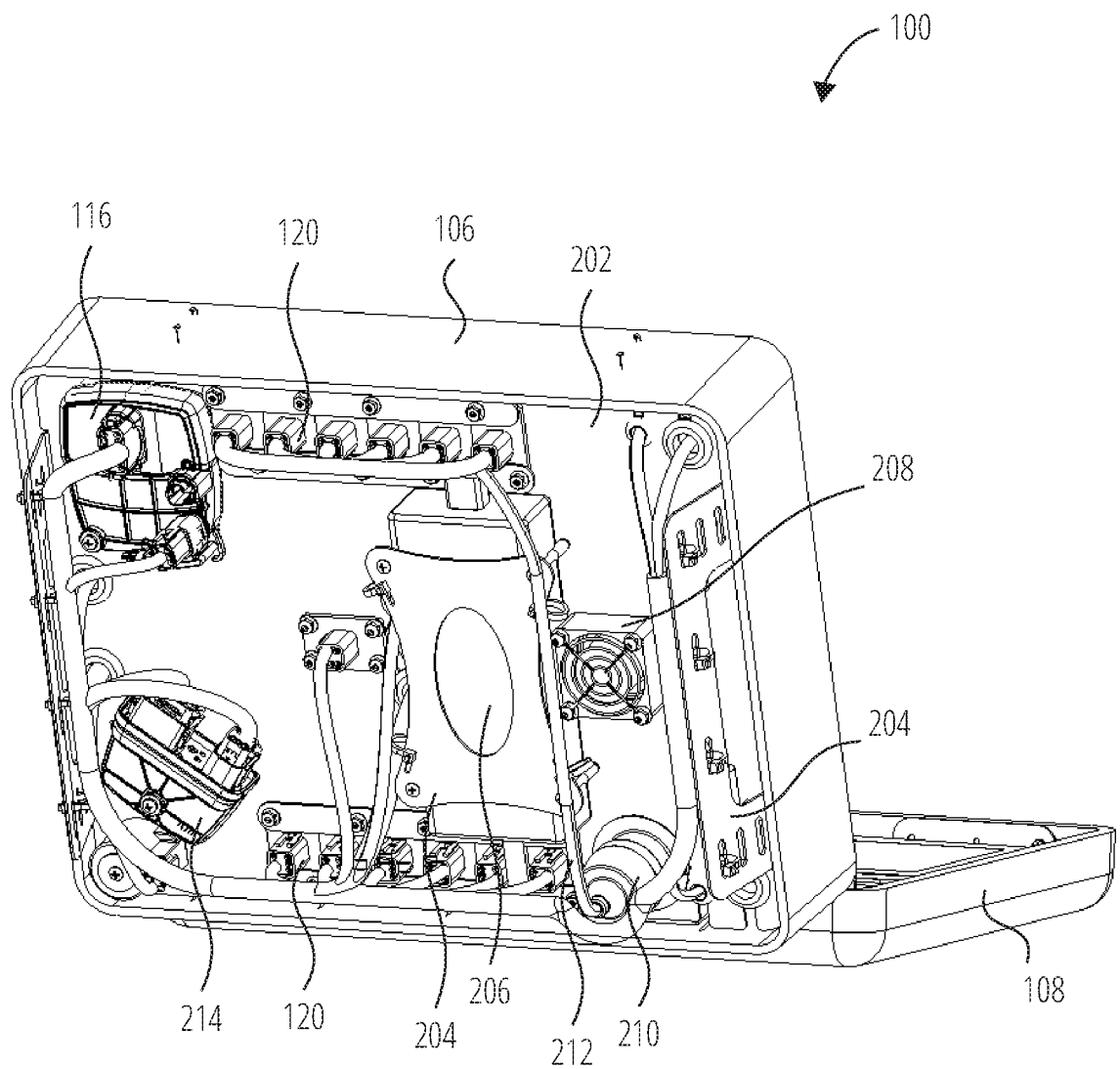
FIG. 2 is a simplified perspective view of an underside of the portable system of FIG. 1 with an outer portion hidden to show the inside of the portable system.
Figure 3:
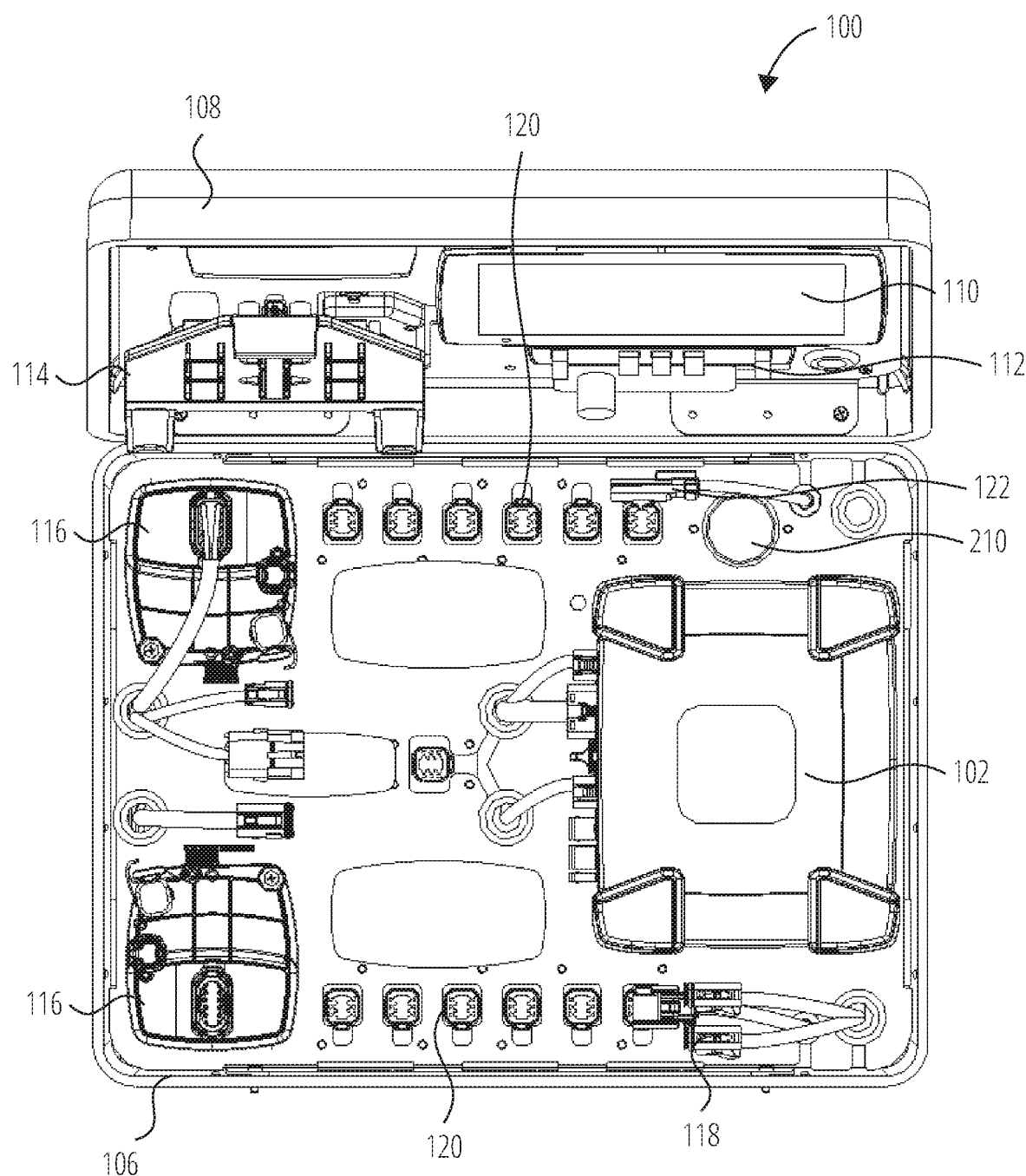
FIG. 3 is a simplified top view of the portable system of FIG. 1.

FIG. 1 is a simplified perspective view of a portable system 100 for testing or demonstrating a portion of an agricultural implement, such as a sensors and actuators associated with seed planters and fertilizer applicators. FIG. 2 is a simplified perspective view of an underside of the portable system 100 with an outer portion hidden to show the inside of the portable system 100. FIG. 3 is a simplified top view of the portable system 100.

The portable system 100 may be used to test or demonstrate a planter, a row unit of a planter, any component of a row unit, or a control system. Typically, the portable system 100 may be electrically connected to a test device as discussed below.

The portable system 100 includes a control system 102 and other components contained within and secured to a case 104. The case 104 may include a base 106 and a lid 108, which may be closed to protect the control system 102 and other components when not in use and when being transported. The lid 108 may be opened to use the portable system 100, and the portable system 100 may be used without removing the control system 102 or other components from the base 106 or the lid 108. The lid 108 may be connected to the base 106 by any known method, such as, without limitation, hinges or removable latches. Typically, a hinge or multiple hinges enable the lid 108 to remain in open configuration adjacent the base 106 without an external support, and enable a user to conveniently use components within the base 106 and the lid 108. The case 104 may have a shape and dimensions similar to a suitcase or briefcase, and may typically be carried by one person.

The control system 102 may be coupled to a graphical user interface 110 and/or mechanical user interface 112, through which a user may interact with the control system 102. The graphical user interface 110 may be a touch screen or a non-touch display. The user may set operating parameters for a test device using the touch screen (if so equipped) and/or using the mechanical user interface 112. In some embodiments, the user may connect a portable multifunctional device to interact with the control system 102, the graphical user interface 110, and/or the mechanical user interface 112. For example, the portable multifunctional device may be, without limitation, a mobile telephone, a portable computer, or a tablet computer. The portable system 100 may include a tablet computer holder 114 in which a user may place a tablet computer to interact with the control system 102, such as to visualize data in a different way or to act as a demonstration of the test device or the control system 102. The graphical user interface 110, mechanical user interface 112, and/or the tablet computer may together provide a similar display and user interface to what an operator would experience in the cab of a tractor. Thus, the portable system 100 may be used for demonstration purposes, in addition to testing.

The control system 102 may typically include processing circuitry electrically coupled to the graphical user interface 110. The processing circuitry of the control system 102 is configured to monitor and display information pertaining to operation of the test devices, such as position, soil temperature, soil moisture, residue amounts, liquid fertilizer flow rate, seed population, down force, and any other monitored or controlled parameter.

The portable system 100 may include one or more distributed controllers 116 in electrical communication with the control system 102, and which may provide data input to the control system 102. The distributed controllers 116 may operate in the same way that a distributed controller of a row unit operates. That is, each distributed controller 116 may receive inputs from one or more sensors, and may provide outputs to one or more actuators to control operation of seed meters, fertilizer flow valves, down force on a disc, or other devices and parameters. The portable system 100 shown includes three distributed controllers 116—two in FIG. 1 and FIG. 3, and one in FIG. 2. The distributed controllers 116 may be used to test individual components of a row unit.

The portable system 100 may also include external controller connectors 118 to connect distributed controllers on row units to the control system 102. When so connected, the control system 102 may bypass the distributed controllers 116 of the portable system 100 to test or demonstrate a row unit as a whole (including to test the distributed controller of the row unit).

Test devices may be connected to the distributed controllers 116 via one or more electrical couplers 120 mounted in the case 104. The electrical couplers 120 may be secured to the base 106 such that wiring is protected behind a panel 202 during normal operations. Brackets 204 may be used to secure the panel 202 or other components to the base 106. The panel 202 may also protect a power supply 206, a cooling fan 208, and other components. An AC plug 210 may be mounted to the panel 202 such that electrical power may be connected to the power supply 206 via a power cord 212. In some embodiments, a DC plug 122 may provide electrical power as an alternative to AC power (e.g., when power is provided by a tractor or another vehicle). The power supply 206 may convert and/or condition either source of power (AC or DC) to an appropriate voltage to power the control system 102, the test devices, and other components. In some embodiments, the control system 102, the test devices, and other components may use DC power from the DC plug 122 directly, bypassing the power supply 206. In other embodiments, the power supply 206 and the AC plug 210 may be omitted, and the control system 102, the test devices, and other components may operate using power from the DC plug 122.

The portable system 100 may also include a simulator module, such as radar simulator 124, shown in FIG. 1. The radar simulator 124 may be operable to simulate the speed of a tractor or implement, and use of the radar simulator 124 may enable certain features of the control system 102 that are designed to be used only when the implement is moving. That is, by sending a simulated signal from the radar simulator 124 to the control system 102, the control system 102 may operate test devices as though they are traveling through a field. Thus, the test devices may be evaluated without moving them (for example and without limitation, in a maintenance shop or at a fixed location in a field). Typically, the radar simulator 124 may generate an electromagnetic signal having a selected frequency. In a real radar system, the frequency output typically corresponds to tractor speed. Thus, by adjusting the signal frequency of the radar simulator 124, the radar simulator 124 may simulate different tractor speeds. The radar simulator 124 may include a user adjustment, such as a dial, to enable a user to change the simulated tractor speed.

In some embodiments, the portable system 100 may optionally include a simulator module 214, shown in FIG. 2, operable to send additional signals to the control system 102 that would otherwise be provided to a control system on a tractor, implement, or planter. The simulator module 214 may provide simulated data to indicate GPS location, radar speed, implement height status (e.g., raised or lowered), and/or gyro turn rate. The simulator module 214 may be provided instead of or in addition to the radar simulator 124. The simulator module 214 may be operable to change multiple parameters during a test, such as to simulate field conditions encountered in a prior planting operation.

Figure 4:
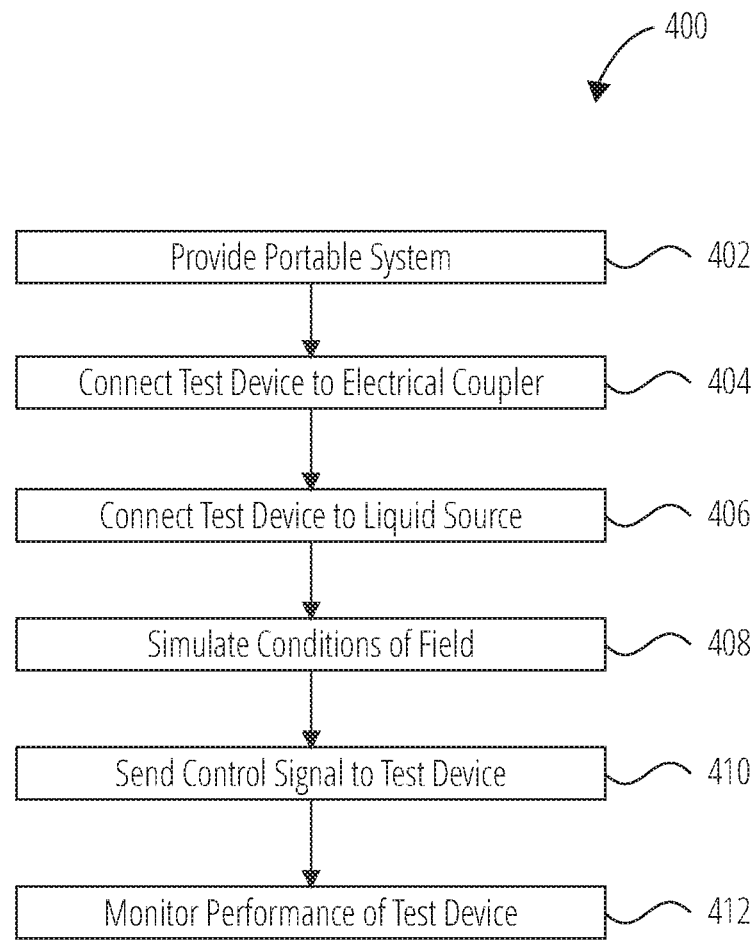
FIG. 4 is a simplified flow chart illustrating a method of testing or demonstrating an agricultural implement.

FIG. 4 is a simplified flow chart illustrating a method 400 in which the portable system 100 may be used for testing or demonstrating an agricultural implement or a portion thereof.

In block 402, a portable system is provided, such as the portable system 100 shown in FIG. 1 through FIG. 3.

In block 404, at least one test device is connected to electrical couplers of the portable system. In block 406, the test device is optionally connected to a liquid source.

In block 408, field conditions are simulated of a field in which the test device is expected to operate. In some embodiments, simulated field conditions are conditions actually encountered in a field during a prior planting season or other prior operation. In block 410, a control signal is sent to the test device. The control signal is based at least in part on data input from a distributed controller.

In block 412, performance of the test device is monitored with the control system. The performance may be monitored without moving an implement carrying the test device. The test device may also be controlled with the control system. If block 406 is included, the method 400 may include monitoring and/or controlling flow of liquid from the liquid source through the test device. Data related to performance of the test device may be displayed on a portable multifunctional device, such as a mobile telephone, a portable computer, or a tablet computer.

The method 400 may be wholly performed without electrically connecting the test device directly or indirectly to a tow vehicle. That is, the method 400 may be performed in a shop, at a stationary location in a field, in a display, or in another location.

Additional non-limiting example embodiments of the disclosure are described below.

Embodiment 1: A portable system for testing or demonstrating an agricultural implement, the system comprising a case. The case carries a power supply, a plurality of electrical couplers configured to receive wiring harnesses associated with test devices, a simulator module configured to simulate at least one operating parameter of the agricultural implement on which test devices are carried, and a control system. The control system comprises a graphical user interface and processing circuitry operably electrically coupled to the graphical user interface and to the wiring harnesses. The processing circuitry is configured to monitor and display information pertaining to operation of the test devices.

Embodiment 2: The portable system of Embodiment 1, further comprising a distributed controller configured to control the test devices and communicate with the control system.

Embodiment 3: The portable system of Embodiment 1, wherein each of the power supply, the electrical couplers, the simulator module, and the control system are secured to the case.

Embodiment 4: The portable system of Embodiment 3, wherein each of the power supply, the electrical couplers, the simulator module, and the control system are interoperable while secured to the case.

Embodiment 5: The portable system of any of Embodiment 1 through Embodiment 4, wherein the case comprises a base and a lid.

Embodiment 6: The portable system of Embodiment 5, wherein when the lid is closed, the power supply, the electrical couplers, the simulator module, and the control system are enclosed within the case.

Embodiment 7: The portable system of any of Embodiment 1 through Embodiment 6, wherein the simulator module comprises a GPS simulator.

Embodiment 8: The portable system of any of Embodiment 1 through Embodiment 7, wherein the simulator module comprises a radar simulator.

Embodiment 9: The portable system of any of Embodiment 1 through Embodiment 8, wherein the simulator module comprises an implement height simulator.

Embodiment 10: The portable system of any of Embodiment 1 through Embodiment 9, wherein the simulator module comprises a gyroscopic simulator.

Embodiment 11: The portable system of any of Embodiment 1 through Embodiment 10, wherein the control system further comprises a mechanical user interface.

Embodiment 12: A method for testing or demonstrating an agricultural implement, the method comprising providing the portable system of any one of Embodiment 1 through Embodiment 11, connecting at least one test device to at least one of the electrical couplers, sending a control signal to the at least one test device, and monitoring performance of the at least one test device with the control system. The control signal based at least in part on the data input.

Embodiment 13: The method of Embodiment 12, wherein monitoring performance of the at least one test device comprises monitoring performance of the at least one test device without moving an implement carrying the at least one test device.

Embodiment 14: The method of Embodiment 12 or Embodiment 13, wherein the method is performed without electrically connecting the at least one test device directly or indirectly to a tow vehicle.

Embodiment 15: The method of any one of Embodiment 12 through Embodiment 14, further comprising connecting the at least one test device to a liquid source.

Embodiment 16: The method of Embodiment 15, wherein monitoring performance of the at least one test device comprises monitoring or controlling flow of liquid from the liquid source through the at least one test device.

Embodiment 17: The method of any one of Embodiment 12 through Embodiment 16, further comprising simulating conditions of a field in which the test device is expected to operate.

Embodiment 18: The method of any one of Embodiment 12 through Embodiment 17, wherein monitoring performance of the at least one test device comprises controlling the at least one test device with the control system.

Embodiment 19: The method of any one of Embodiment 12 through Embodiment 18, wherein monitoring performance of the at least one test device comprises displaying data related to performance of the at least one test device on a portable multifunctional device.

Embodiment 20: The method of Embodiment 19, wherein the portable multifunctional device comprises a tablet computer.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A portable system for testing or demonstrating an agricultural implement, the system comprising a case, the case carrying:
   a power supply;
   a plurality of electrical couplers configured to receive wiring harnesses associated with test devices;
   a simulator module configured to simulate at least one operating parameter of the agricultural implement on which test devices are carried, the at least one operating parameter selected from the group consisting of GPS location, radar speed, and gyro turn rate, the simulator module further configured to simulate the agricultural implement in both a raised state and a lowered state; and
   a control system configured to operate the test devices as though the test devices are traveling through a field in the lowered state and evaluate the test devices without moving them, the control system comprising:
   a graphical user interface; and
   processing circuitry operably electrically coupled to the graphical user interface and to the wiring harnesses, the processing circuitry configured to monitor and display information pertaining to operation of the test devices;
   wherein the simulator module is configured to send the simulated at least one operating parameter to the control system.

2. The portable system of claim 1, further comprising a distributed controller configured to control the test devices and communicate with the control system.

3. The portable system of claim 1, wherein each of the power supply, the electrical couplers, the simulator module, and the control system are secured to the case.

4. The portable system of claim 3, wherein each of the power supply, the electrical couplers, the simulator module, and the control system are interoperable while secured to the case.

5. The portable system of claim 1, wherein the case comprises a base and a lid.

6. The portable system of claim 5, wherein when the lid is closed, the power supply, the electrical couplers, the simulator module, and the control system are enclosed within the case.

7. The portable system of claim 1, wherein the simulator module comprises a GPS simulator.

8. The portable system of claim 1, wherein the simulator module comprises a radar simulator.

9. The portable system of claim 1, wherein the simulator module comprises a gyroscopic simulator.

10. The portable system of claim 1, wherein the control system further comprises a mechanical user interface.

11. A method for testing or demonstrating an agricultural implement, the method comprising:
    providing the portable system of claim 1;
    connecting at least one test device to at least one of the electrical couplers;
    sending a control signal to the at least one test device, the control signal based at least in part on the at least one operating parameter; and
    monitoring performance of the at least one test device with the control system.

12. The method of claim 11, wherein monitoring performance of the at least one test device comprises monitoring performance of the at least one test device without moving an implement carrying the at least one test device.

13. The method of claim 11, wherein the method is performed without electrically connecting the at least one test device directly or indirectly to a tow vehicle.

14. The method of claim 11, further comprising connecting the at least one test device to a liquid source.

15. The method of claim 14, wherein monitoring performance of the at least one test device comprises monitoring or controlling flow of liquid from the liquid source through the at least one test device.

16. The method of claim 11, further comprising simulating conditions of a field in which the test device is expected to operate.

17. The method of claim 11, wherein monitoring performance of the at least one test device comprises controlling the at least one test device with the control system.

18. The method of claim 11, wherein monitoring performance of the at least one test device comprises displaying data related to performance of the at least one test device on a portable multifunctional device.

19. The method of claim 18, wherein the portable multifunctional device comprises a tablet computer.

* * * * *